United States Patent [19]

Kimura et al.

[11] Patent Number: 4,850,726
[45] Date of Patent: Jul. 25, 1989

[54] WORD PROCESSOR PROVIDED WITH AN AUTOMATIC TABSET MEANS

[75] Inventors: Kouji Kimura; Hiroshi Mitsuyuki, both of Hitachi; Akihiko Yamamoto, Ibaraki; Yutaka Satoh, Katsuta, all of Japan

[73] Assignee: Hitachi, Ltd., Tokyo, Japan

[21] Appl. No.: 105,807

[22] Filed: Oct. 8, 1987

[30] Foreign Application Priority Data

Oct. 8, 1986 [JP] Japan .................. 61-237940

[51] Int. Cl.⁴ .......................................... B41J 25/18
[52] U.S. Cl. ................................. 400/279; 364/900
[58] Field of Search ... 364/200 MS File, 900 MS File; 400/279

[56] References Cited

U.S. PATENT DOCUMENTS

4,448,557  5/1984  Horn et al. ................... 364/900

Primary Examiner—Gareth D. Shaw
Assistant Examiner—John G. Mills
Attorney, Agent, or Firm—Antonelli, Terry & Wands

[57] ABSTRACT

A word processor is disclosed in which a central processing unit for editing a document on the basis of characters, rule line data and processing commands from a keyboard, has an automatic tabset function of setting a tab automatically in the column following a column where a ruled line is set, on the basis of the ruled line data.

4 Claims, 11 Drawing Sheets

| ITEM NUMBER | TITLE OF ITEM | | VERTICAL RULED LINE | HORIZONTAL RULED LINE |
|---|---|---|---|---|
| 715 — 1 | FIRST SPECIFIED POSITION | ROW NUMBER | 2 | 10 |
|  |  | COLUMN NUMBER | 4 | 15 |
| 716 — 2 | SECOND SPECIFIED POSITION | | 15 | 30 |
| 717 — 3 | DIRECTION OF RULED LINE | | 1 | 2 |
| 718 — 4 | KIND OF RULED LINE | | 1 | 1 |
| 719 — 5 | COLUMN NUMBER OF TAB POSITION | | 5 | 0 |
| 720 — 6 | TAB NUMBER | | 1 |  |

| ITEM NUMBER | TITLE OF ITEM | | | |
|---|---|---|---|---|
| 1 | FIRST SPECIFIED POSITION ROW NUMBER | 2 | 2 | 2 |
| | FIRST SPECIFIED POSITION COLUMN NUMBER | 4 | 14 | 29 |
| 2 | SECOND SPECIFIED POSITION | 15 | 15 | 15 |
| 3 | DIRECTION OF RULED LINE | 1 | 1 | 1 |
| 4 | KIND OF LINE | 1 | 1 | 1 |
| 5 | COLUMN NUMBER OF TAB POSITION | 5 | 15 | 30 |
| 6 | TAB NUMBER | 1 | 2 | 3 |

| FIRST SPECIFIED POSITION | | SECOND SPECIFIED POSITION | | SECOND SPECIFIED POSITION FIELD | FIELD FOR DIRECTION OF RULED LINE | FIELD FOR KIND OF RULED LINE | FIELD FOR COLUMN NUMBER OF TAB POSITION | TAB NUMBER FIELD |
|---|---|---|---|---|---|---|---|---|
| ROW FIELD | COLUMN FIELD | ROW FIELD | COLUMN FIELD | | | | | |

FIG. 10

| ITEM NUMBER | TITLE OF ITEM | | | | | |
|---|---|---|---|---|---|---|
| 1 | FIRST SPECIFIED POSITION | ROW NUMBER | 2 | 2 | 2 | 2 |
| | | COLUMN NUMBER | 4 | 14 | 19 | 29 |
| 2 | SECOND SPECIFIED POSITION | | 15 | 15 | 15 | 15 |
| 3 | DIRECTION OF RULED LINE | | 1 | 1 | 1 | 1 |
| 4 | KIND OF LINE | | 1 | 1 | 1 | 1 |
| 5 | COLUMN NUMBER OF TAB POSITION | | 5 | 15 | 20 | 30 |
| 6 | TAB NUMBER | | 1 | 2 | 3 | 4 |

| ITEM NUMBER | TITLE OF ITEM | | | |
|---|---|---|---|---|
| 1 | FIRST SPECIFIED POSITION — ROW NUMBER | 2 | 2 | 2 |
| | FIRST SPECIFIED POSITION — COLUMN NUMBER | 4 | 14 | 29 |
| 2 | SECOND SPECIFIED POSITION | 15 | 15 | 15 |
| 3 | DIRECTION OF RULED LINE | 1 | 1 | 1 |
| 4 | KIND OF LINE | 1 | 1 | 1 |
| 5 | COLUMN NUMBER OF TAB POSITION | 5 | 15 | 30 |
| 6 | TAB NUMBER | 1 | 2 | 3 |

| ITEM NUMBER | TITLE OF ITEM | | | |
|---|---|---|---|---|
| 1 | FIRST SPECIFIED POSITION | ROW NUMBER | 2 | 2 |
| | | COLUMN NUMBER | 4 | 29 |
| 2 | SECOND SPECIFIED POSITION | | 15 | 15 |
| 3 | DIRECTION OF RULED LINE | | 1 | 1 |
| 4 | KIND OF LINE | | 1 | 1 |
| 5 | COLUMN NUMBER OF TAB POSITION | | 5 | 30 |
| 6 | TAB NUMBER | | 1 | 2 |

FIG. 13

WORD PROCESSOR PROVIDED WITH AN AUTOMATIC TABSET MEANS

BACKGROUND OF THE INVENTION

The present invention relates to a word processor, and more particularly to a word processor capable of setting a tab automatically.

The use of a tab in preparing a document by a word processor, makes it easy to rule up the starting positions of character strings or the heads of the contents of a table. A Japanese Patent Application No. JP-A-59-65339 discloses a word processor, in which when the number of characters capable of being written in one row is set by an operator to determine a format, a writable region is displayed on a display screen in accordance with the format, and a tab is automatically set at both ends of the above region.

In this word processor, however, there arises the following problem. In a case where the writable region is divided by vertical ruled lines into a plurality of columns and it is necessary to rule up the heads of character strings written in each column, an operator is required to perform a tabset operation for each column, and thus tabset processing becomes cumbersome.

SUMMARY OF THE INVENTION

It is an object of the present invention to provide a word processor capable of making easy the tabset operation for ruling up the heads of character strings written in each of regions which are bounded by ruled lines.

In order to attain the above object, according to the present invention, there is provided a word processor provided with automatic tabset means, in which a position where a tab is to be set, is determined on the basis of the position of a ruled line given by the positional information of the ruled line, and the tab is set at the above tab position.

That is, according to the present invention, when a ruled line is set, a tab is automatically set in accordance with the ruled line. Thus, a tabset operation can be omitted which is performed by an operator to rule up the heads of character strings written in a region between a pair of ruled lines.

DESCRIPTION OF THE PREFERRED EMBODIMENT

Now, explanation will be made of an embodiment of a Japanese word processor according to the present invention, with reference to the drawings.

Figure 2:
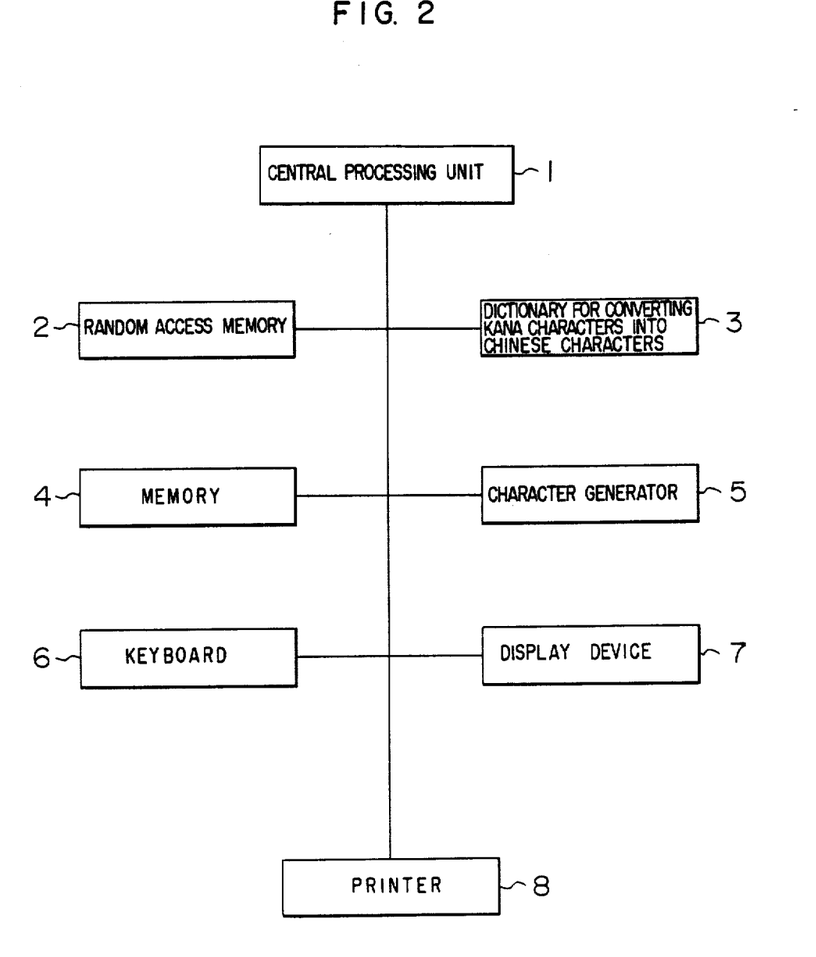
FIG. 2 is a block diagram showing the construction of the embodiment.

FIG. 2 is a block diagram showing the construction of the above embodiment. In FIG. 2, reference numeral 1 designates a CPU (namely, central processing unit), 2 a random access memory for storing programs which are used to input and edit Japanese characters and to control a display device, for storing display control information which is used to control a displayed image, and for storing various data. 3 a dictionary for converting kana characters into Chinese characters, 4 a memory for storing a document which is prepared by the present embodiment, a document which is inputted to the present embodiment programs, data, and dictionaries, 5 a character generator for storing character patterns to generate print letters or displayed characters, 6 a keyboard for inputting characters and data and for specifying a control operation, 7 a display device (for example, a CRT display) for displaying characters which are inputted to and edited by the present embodiment, and 8 a printer for printing out a document which is prepared by the present embodiment.

Figure 3:
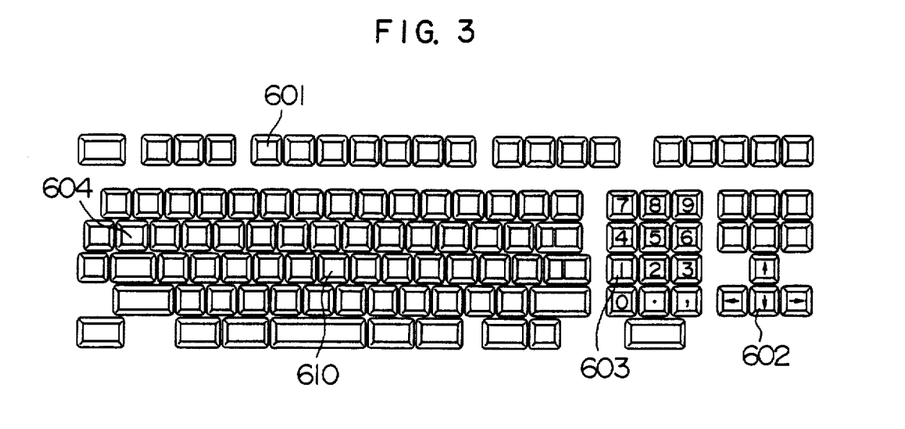
FIG. 3 is a schematic diagram showing the arrangement of keys on the keyboard of FIG. 2.

FIG. 3 shows the arrangement of keys on the keyboard 6 of FIG. 2. In FIG. 3, only keys necessary for enplaining the present embodiment are designated by reference numerals, and the remaining keys are arranged in the same manner as in an ordinary keyboard. In FIG. 3, reference numeral 601 designates a "ruled-line" key for setting or deleting a ruled line, 602 a "cursor" key for moving a cursor up and down, or left and right, 603 a "ten" key, 604 a "tab" key for causing an input position to skip over a tab position which is set by a format, and 610 a character key portion. Although characters indicated by keys of the character key portion 610 are not shown in FIG. 3, such characters are arranged in the same manner as in a kana keyboard according to the Japanese Industrial Standards. Explanation of keys other than the above-mentioned will be omitted for the sake of brevity.

Figure 4:
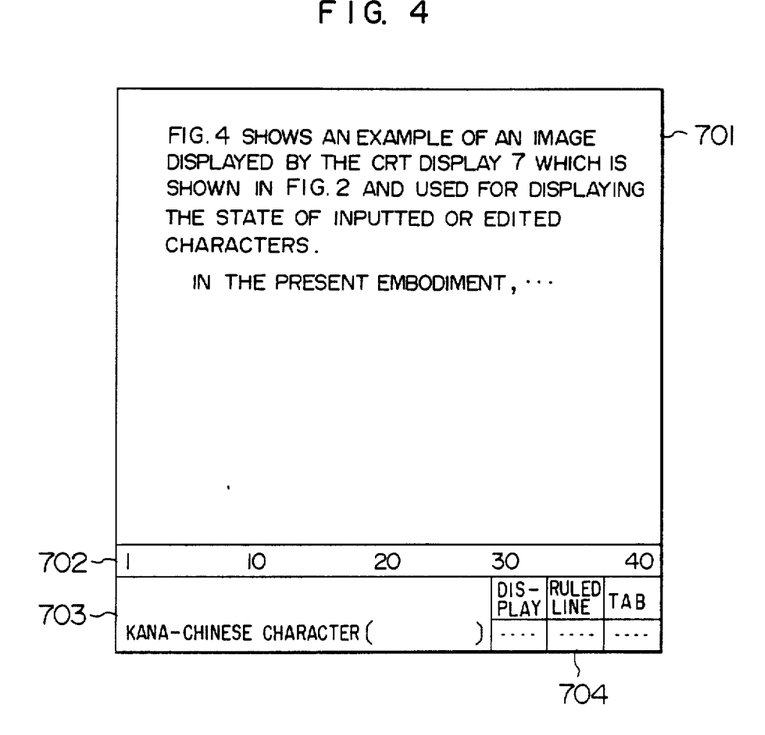
FIG. 4 is a schematic diagram showing a displayed image at a time a document is being edited.

FIG. 4 shows an example of an image displayed by the CRT display 7 which is shown in FIG. 2 and used for displaying the state of inputted or edited characters.

In the present embodiment, the display screen of the CRT display 7 can display twenty rows each made up of characters, and one row can contain 82 half-size characters each having a width of 12 dots, or 41 full-size characters each having a width of 24 dots. In other words, the display screen can display 560 dots in a vertical direction and 1024 dots in a horizontal direction. Further, the CRT display 7 can carry out a graphic representation in such a manner that all the dots are controlled independently of one another.

In FIG. 4, reference numeral 701 designates an inputted/edited character string display region capable of displaying 17 rows each made up of characters (namely, capable of displaying 476 dots in a vertical direction) to display inputted or edited character strings (it is to be noted that when a vertical ruled line is set in the display region 701, a tab is automatically set and displayed on the display screen), 702 a column indicating region capable of displaying one row made up of characters to indicate a column number and the position of a cursor or tab, 703 a guidance display region capable of displaying two rows each made up of characters to display the kind of processing and to display guide message with respect to the state of input data and an operation to be performed, and 704 a matrix display region divided into three or 2×3 parts for displaying virtual keys capable of expressing various control commands and special characters by combinations of six keys which belong to the "ten" key 603 and indicate numerals "1" to "6". The region 704 can display two rows each made up of characters, and has a width corresponding to nine full-size characters. When those keys belonging to the "ten" key 603 which correspond to a virtual key, are pressed, a control operation expressed by the virtual key is performed.

Figure 1A:
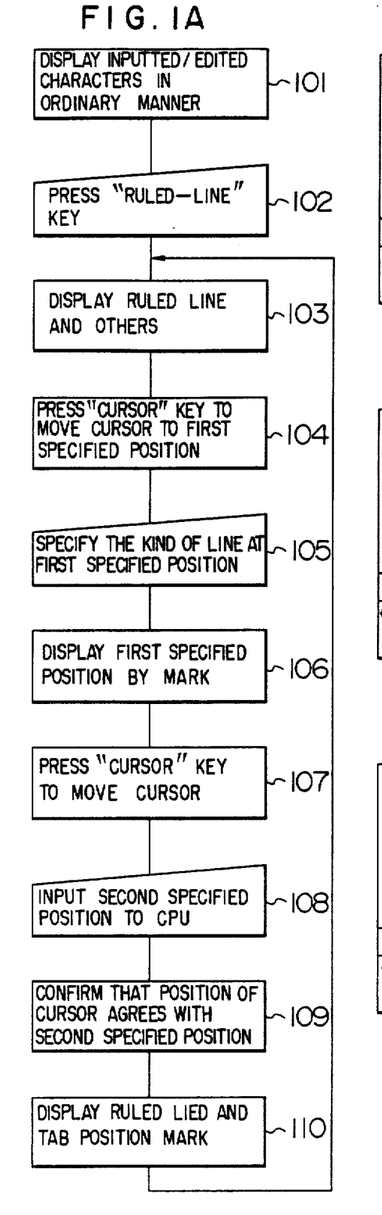
FIG. 1A is a flow-chart for explaining the automatic tabset processing of an embodiment of a Japanese word processor according to the present invention.
Figure 1B:
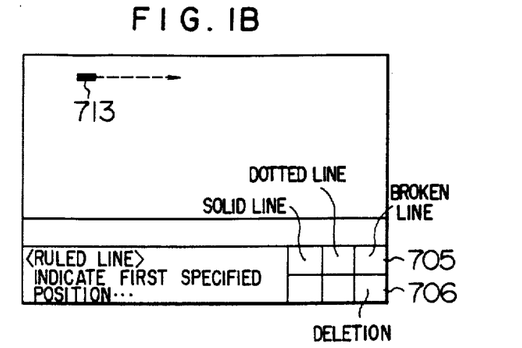
FIGS. 1B, 1C and 1D are schematic diagrams which show displayed images corresponding to a few steps of the flow chart of FIG. 1A.
Figure 1C:
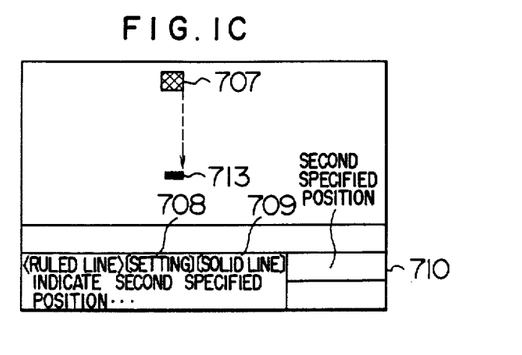
Figure 1D:
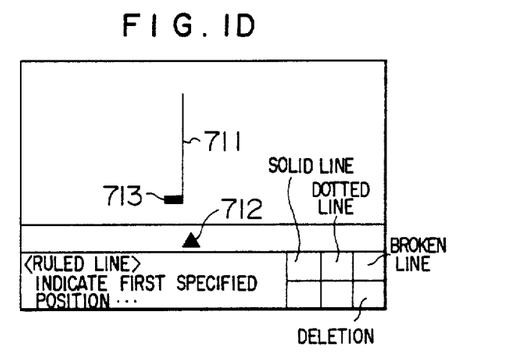

FIG. 1A is a flow chart showing the process of data processing which is carried out by the CPU 1 to automatically set a tab at a time a vertical ruled line is set, and FIGS. 1B to 1D show images which are displayed on the display screen in three steps of the above process.

Explanation will be made of the processing which is carried out after characters have been inputted and edited in an ordinary manner in step 101. In step 102, the "ruled-line" key 601 is pressed. Then, a word "ruled-line" is displayed in the guidance display region 703, and the kind of ruled-line processing and the kind of the ruled line are displayed in the matrix display region 704 on the basis of an image control program (step 103). The ruled-line processing is classified into the setting of a ruled line and the deletion thereof. An operator selects the kind of ruled-line processing and the kind of the ruled line by means of the "ten" key 603. In a case where a new ruled line is set, one of three kinds of lines (namely, solid, dotted and broken lines) expressed by virtual keys 705 can be selected by the "ten" key 603. Further, in a case where a ruled line is deleted, a virtual key 706 for deletion is selected. Now, explanation will be made of a case where a ruled line formed of a solid line is set, by way of example.

The "cursor" key 602 is pressed so that the CPU 1 moves a cursor 713 to the starting position of a ruled line to be set, that is, a first specified position (step 105). When the cursor 713 reaches the first specified position, the "ten" key 603 is operated so that the desired one of the virtual keys 705 is selected, that is, a desired one of solid, dotted and broken lines is selected (step 105). In step 106, as shown in FIG. 1C, the first specified position is indicated by a white mark 707, a message 708 indicating the desired one of the setting and deletion of ruled line and a message 709 indicating the desired one of solid, dotted and broken lines are displayed, and the matrix display region is divided into upper and lower portions to display a virtual key 710 for indicating a second specified position.

Then, the operator moves the cursor 713 from the first specified position to the second specified position, that is, the end position of the ruled line. In the present case, a vertical ruled line is set, and hence the cursor 713 is moved from the first specified position in a vertical direction.

In step 107, the "cursor" key 602 is operated so that the cursor 713 is moved in the vertical direction. When the movement of the cursor 713 terminates, the "ten" key 603 is operated so that the virtual key 710 is selected, that is, the second specified position is inputted to the CPU 1 (step 108). In step 109, it is confirmed by a judgement control program that the position of the cursor 713 agrees with the second specified position. In step 110, the ruled line thus specified and the position of tab are displayed in accordance with an image control program. As shown in FIG. 1D, a vertical ruled line 711 is set between the first specified position and the second specified position so that the right end of the cursor 713 lies on the line 711, and a tab position mark 712 is set in the column following a column, in which the cursor 713 has been moved. Further, the guidance display region 703 and the matrix display region 704 are returned to the state shown in FIG. 1B, to make it possible to again set or delete a ruled line.

Figure 5A:
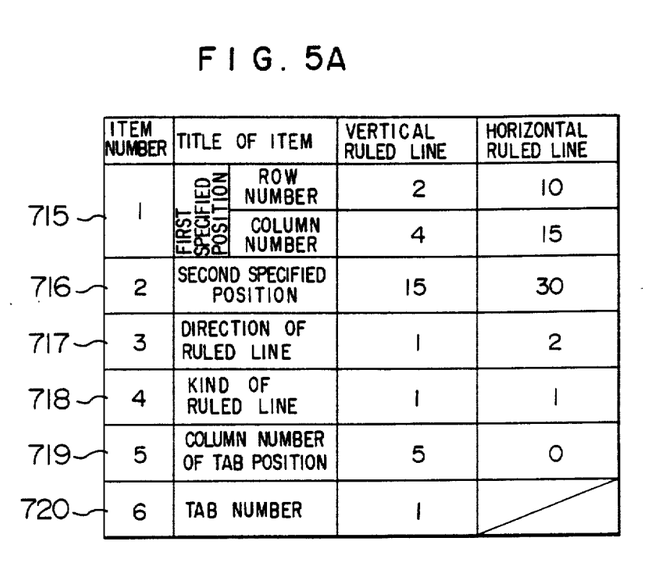
FIG. 5A shows a management information table with respect to a ruled line and a tab.
Figure 5B:
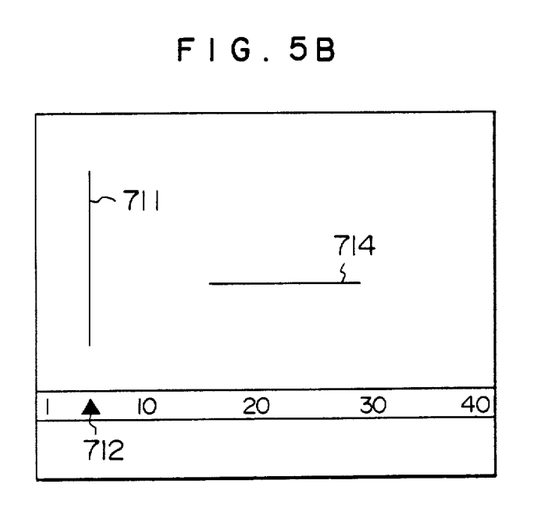
FIG. 5B shows a displayed image corresponding to the table of FIG. 5A.

FIG. 5A shows an example of a management information table stored in the random access memory 2 for setting a ruled line so that the specified position of the ruled line and the set position of a tab are related as above. In other words, FIG. 5A is a management information table for a case where, as shown in FIG. 5B, a vertical ruled line 711 and a horizontal ruled line 712 are set. In FIG. 5A, reference numeral 715 designates information on a first specified position (that is, the row number and column number of the first specified position), 716 designates information on a second specified position (that is, the column number of the second specified position for a case where the first and second specified positions lie in the same row and thus a horizontal ruled line is indicated by the first and second specified positions, and the row number of the second specified position for a case where the first and second specified positions lie in the same column and thus a vertical ruled line is indicated by the first and second specified positions), 717 the direction of ruled line determined by the above information 716 (it is to be noted that numeral "1" indicates a vertical direction and numeral "2" a horizontal direction), 718 information on the kind of a ruled line (it is to be noted that numerals "1", "2" and "3" indicate solid, dotted and broken lines, respectively), 719 information on the set position of a tab (it is to be noted that a column number obtained by adding one (1) to the column number of the first specified position is used for a case where a vertical ruled line is set, and that zero (0) is used for a case where a horizontal ruled line is set, to indicate the disuse of the tab), and 720 designate tab numbers given in order of column numbers.

Figure 6:
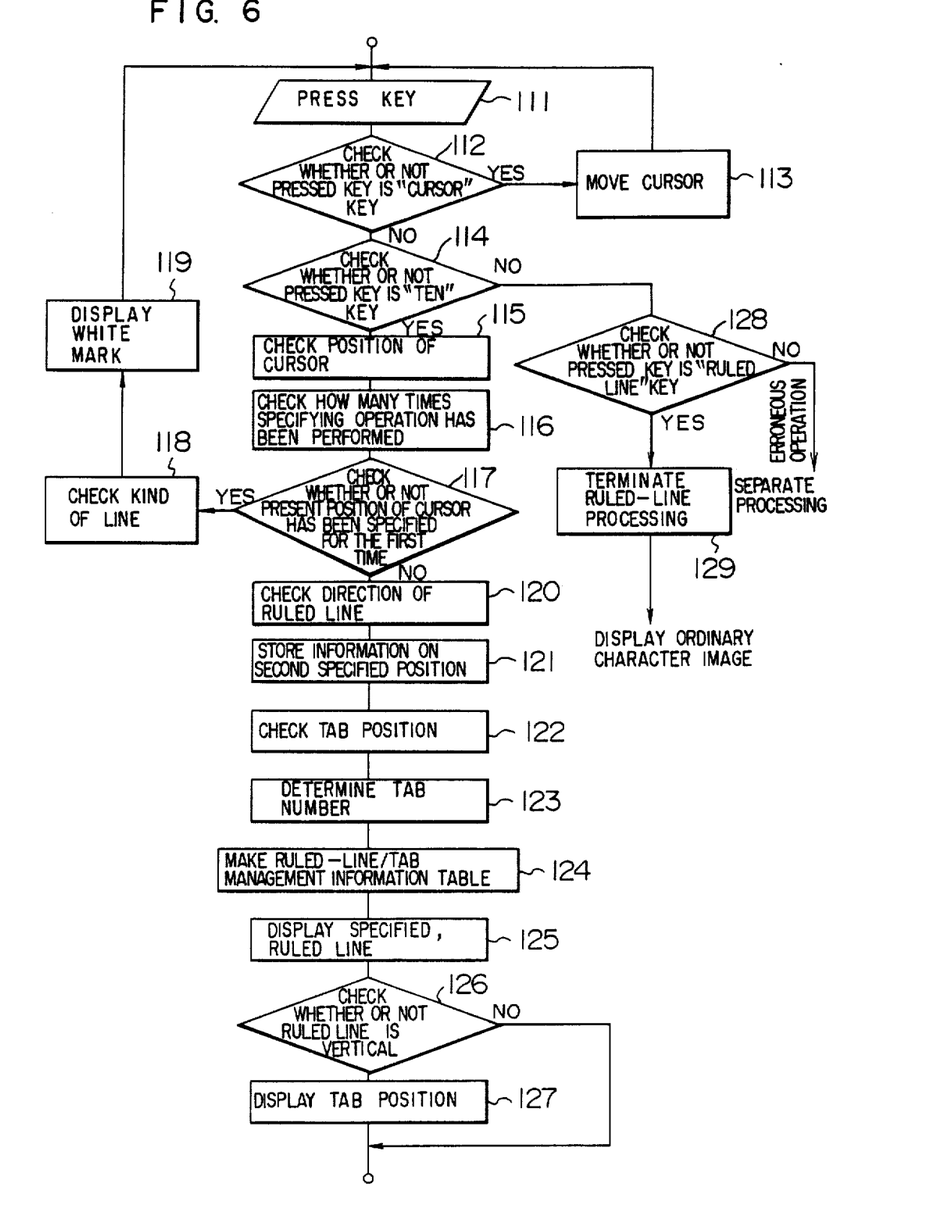
FIG. 6 is a flow chart which shows the processing for controlling management information.

FIG. 6 is a flow chart showing the process of processing which is carried out by the CPU 1 to control management information which form the basis of the specified position of a ruled line. In the following explanation, the movement of cursor and the error processing will be regarded as separate processing and will be omitted Now, explanation will be made of the processing for setting an additional ruled line, with reference to FIGS. 7A to 10.

Figure 7A:
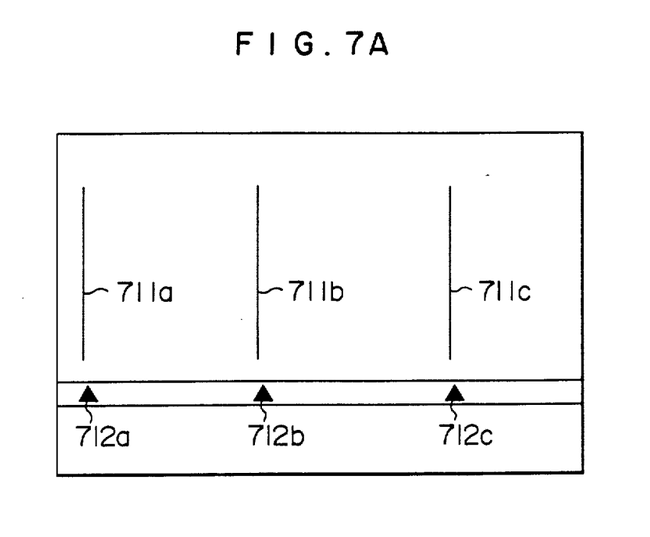
FIG. 7A is a schematic diagram showing a displayed image which contains ruled lines and tab position indicating marks.
Figure 7B:
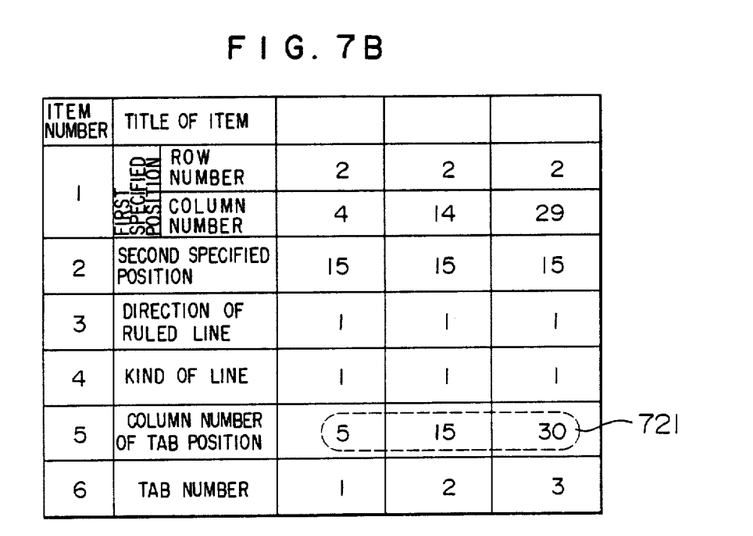
FIG. 7B shows a management information table corresponding to the image of FIG. 7A.

FIG. 7A shows that three vertical ruled lines 711a to 711c have been set on the display screen, and tab position marks 712a to 712c corresponding to the ruled line 711a to 711c have also been set. Further, FIG. 7B shows a management information table corresponding to the image of FIG. 7A.

Figure 8A:
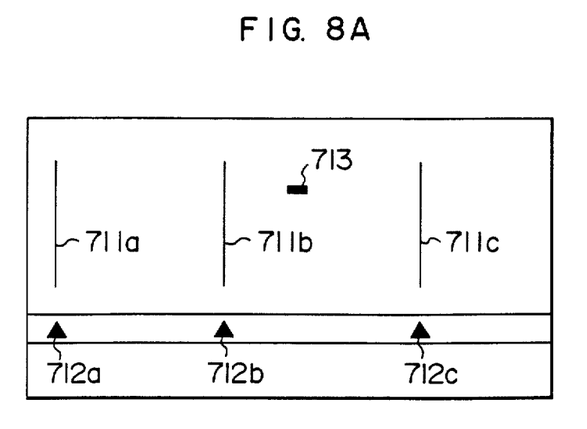
FIGS. 8A to 8C are schematic diagrams which show displayed images for explaining that when a ruled line is set, a tab is automatically set.

Referring back to FIG. 6, a key is pressed in step 111, and it is checked in step 112 whether or not the pressed key is the "cursor" key 602. When the pressed key is judged to be the "cursor" key, the cursor 713 is moved in step 113. The movement of the cursor is repeated so that the cursor 713 is located as shown in FIG. 8A. Thereafter, the "ten" key 603 is pressed. Then, the pressed key is judged to be the "ten" key (step 114), and the present position of the cursor is checked. Thus, it is known in step 115 that the row number and column number of this position are equal to two (2) and nineteen (19), respectively. The row number and column number thus determined are set in row and column fields of a work area for indicating a first specified position, respectively. The work area is a memory area for temporarily storing information which is obtained in setting a ruled line, in a manner shown in FIG. 9, and the contents of the work area are set in a management information table after the position of the ruled line has been determined.

Figure 8B:
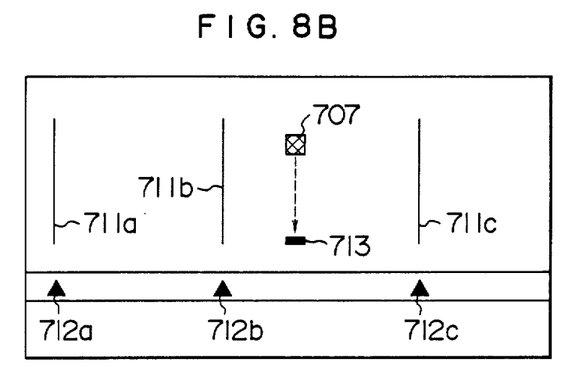

Next, it is checked how many times a specifying operation has been performed (step 116). When it is judged in step 117 that the present position of the cursor has been specified for the first time, the kind of the ruled line is checked, and information on the kind of the ruled line is stored in the work area (step 118). In step 119, the first specified position is indicated by the while mark 707 as shown in FIG. 8B. Then, the processing is returned to step 111, to perform a key operation for indicating a second specified position.

Next, a key operation for moving the cursor 713 to the second specified position of FIG. 8B, is performed in steps 111 to 113. Thereafter, the "ten" key 603 is pressed, and it is judged in step 114 that the pressed key is the "ten" key. Then, the present position of the cursor is checked, and thus it is known in step 115 that the row number and column number of the above position are equal to fifteen (15) and nineteen (19), respectively. The row number and column number thus determined are set in row and column fields of the work area for indicating a second specified position, respectively. It is again checked how many times a specifying operation has been performed (step 116). When it is judged in step 117 that the present position of the cursor is specified for the second time, the row number and column number stored in the row and column fields of, the work area for indicating the first specified position are compared with those stored in the row and column fields for indicating the second specified position, to know the direction of the ruled line (step 120). In a case where the first and second specified positions have the same column number, the ruled line is judged to be a vertical straight line, and a numeral "1" is set in the ruled-line direction field of the work area. In step 121, the row number of the second specified position is set in the second specified position field of the work area. Then, the processing in step 122 is carried out.

Figure 10:
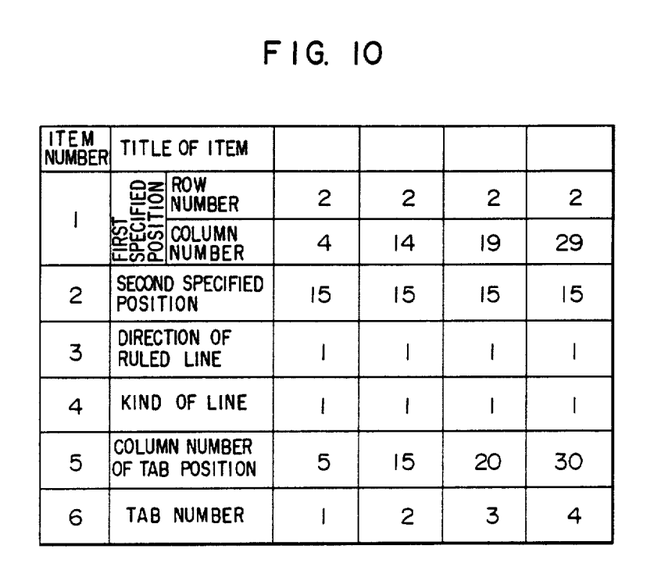
FIG. 10 shows a management information table corresponding to the displayed image of FIG. 8C.

In a case where a vertical ruled line is set, a value (that is, a numeral "20") obtained by adding one to the column number (that is, "19") of the first specified position is set in a field of the work area for indicating the column number of the position of a tab. The column number of the present tab position and the column numbers of the tab positions which have been already set, are arranged in the ascending order, and it is judged in step 123 where is the present tab position. That is, in step 123, the column number of the present tab position is compared with column number data 701 contained in the management information table of FIG. 7B. Thus, the number of the present tab is judged to be "3". The contents of the work area thus determined are set in the management information table (step 124). At this time, the contents of the management information table are rearranged as shown in FIG. 10, on the basis of the number of the above tab.

Figure 8C:
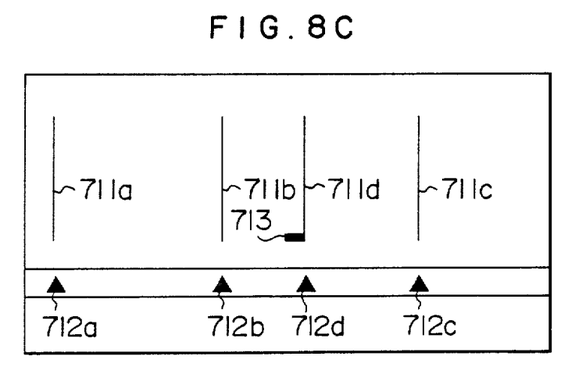
Figure 9:
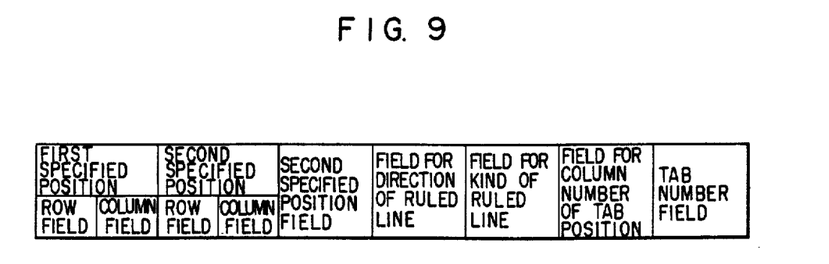
FIG. 9 is a schematic diagram showing the arrangement of data at a work area of the random access memory of FIG. 2.

Next, a ruled line 711d is displayed as shown in FIG. 8C, on the basis of information contained in the work area (step 125). In step 126, it is checked whether or not the ruled line 711d is a vertical straight line. When the ruled line 711d is judged to be the vertical straight line, a tab position mark 712d is additionally displayed in the column indicating region 702, as shown in FIG. 8C (step 127).

When it is judged in step 114 that the pressed key is a key other than the "ten" key, the processing in step 128 is carried out. That is, it is judged in step 128 whether or not the pressed key is the "ruled-line" key 601. When the pressed key is judged to be the "ruled-line" key, a ruled-line processing operation is terminated (step 129). Then, an ordinary character image is displayed.

Figure 11A:
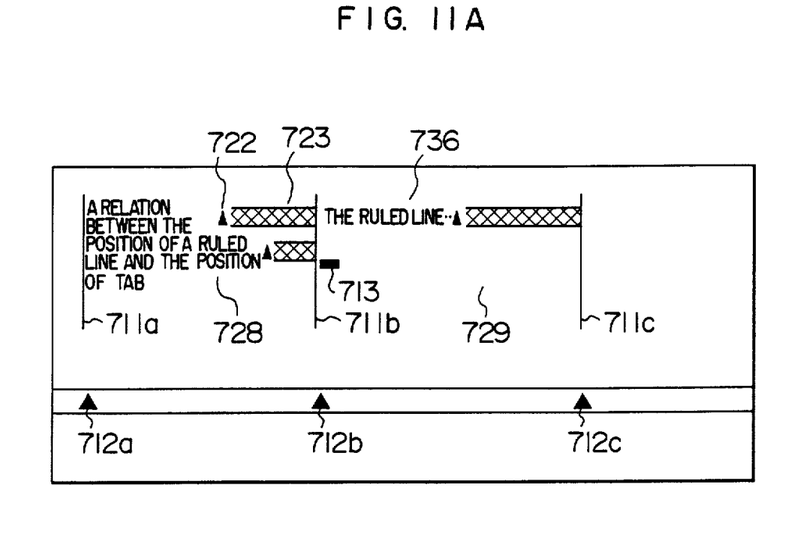
FIG. 11A is a schematic diagram showing a displayed image which contains inputted character strings.
Figure 11B:
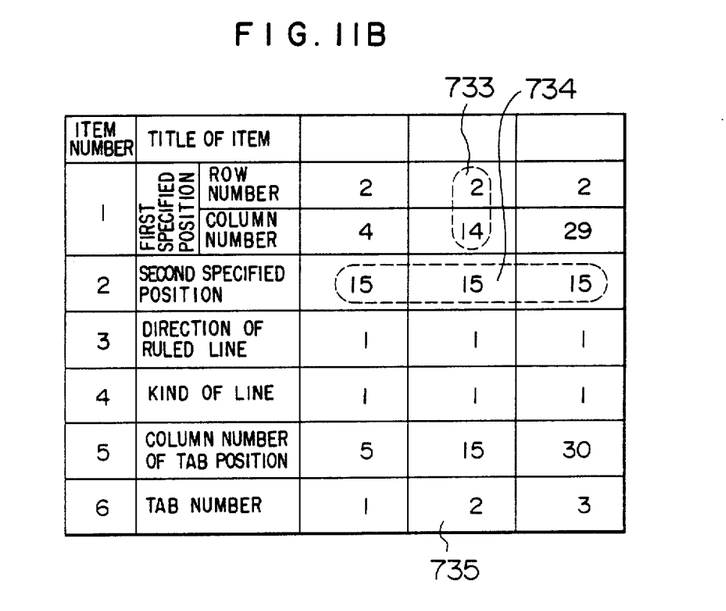
FIG. 11B shows a management information table corresponding to the image of FIG. 11A.

FIG. 11A shows an image which is displayed on the display screen when characters are inputted and edited in a state that tabs 712a to 712c are automatically set on the basis of vertical ruled lines 711a to 711c, and FIG. 11B shows a management information table corresponding to the image of FIG. 11A. Referring to FIG. 11A, when a tab mark 722 is displayed at a desired position by means of the "tab" key 604, the cursor 713 skips over to the next tab position, and a tab skip mark 723 is displayed between the position of the tab mark 722 and the next tab-position in such a manner that the background brightness is reduced by half. It is impossible to arrange characters in a range indicated by the tab skip mark 723. Further, in FIG. 11, reference numerals 728 and 729 designate editing regions defined by vertical ruled lines and tabs. When the "tab" key 604 is operated after characters have been inputted to a row of the region 728, the tab skip mark 723 is displayed between the position specified by the "tab" key and the ruled line 711b in the last column of the region 728, and the cursor 713 is set in the first column of the next region 729. As mentioned above, the ruled lines 711b and 711c indicate the lost columns of the editing regions 728 and 729, respectively, and the tab position marks 712a and 712b indicate the first columns of the regions 728 and 729, respectively.

Figure 12A:
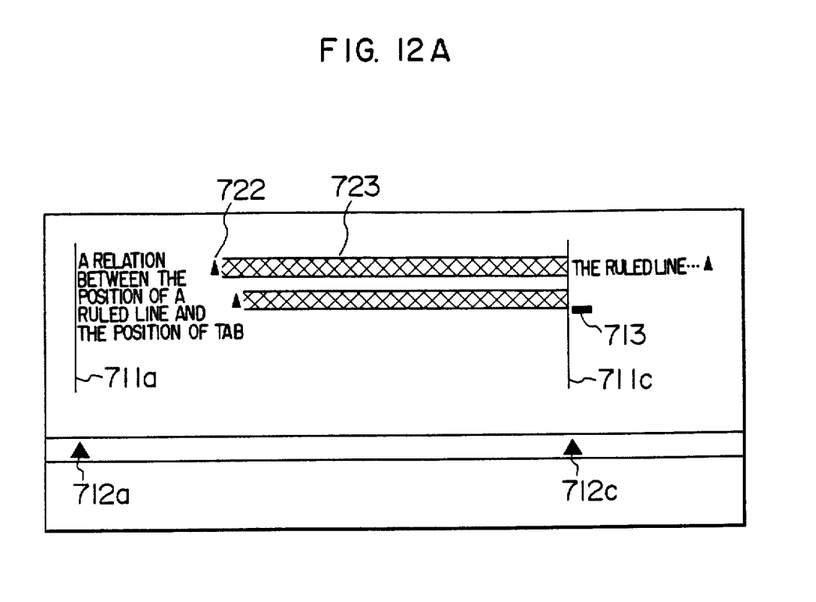
FIG. 12A is a schematic diagram showing a displayed image which is formed when one ruled line is deleted from the image of FIG. 11A.
Figure 12B:
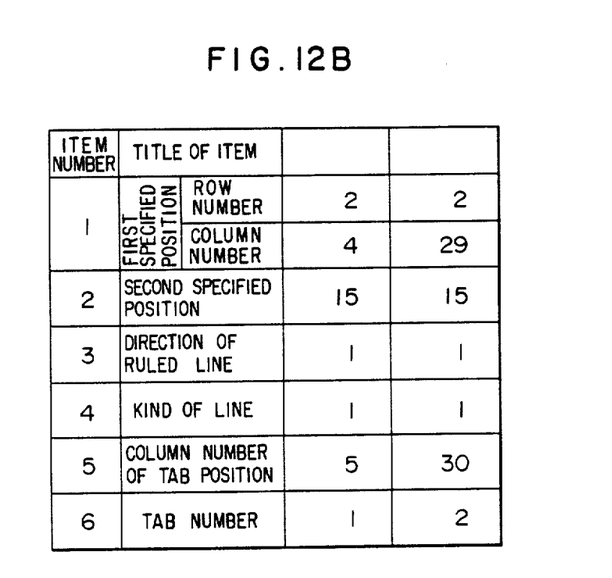
FIG. 12B shows a management information table corresponding to the image of FIG. 12A.

FIG. 12A shows an image which is displayed on the display screen when the ruled line 711b of FIG. 11A is deleted by selecting the virtual key 706 for deletion, and FIG. 12B is a management information table corresponding to the image of FIG. 12A. As shown in FIG. 12A, when the ruled line 711b is deleted, the tab position mark 712b is also deleted and the tab skip mark 723 is elongated to the ruled line 711c.

Figure 13:
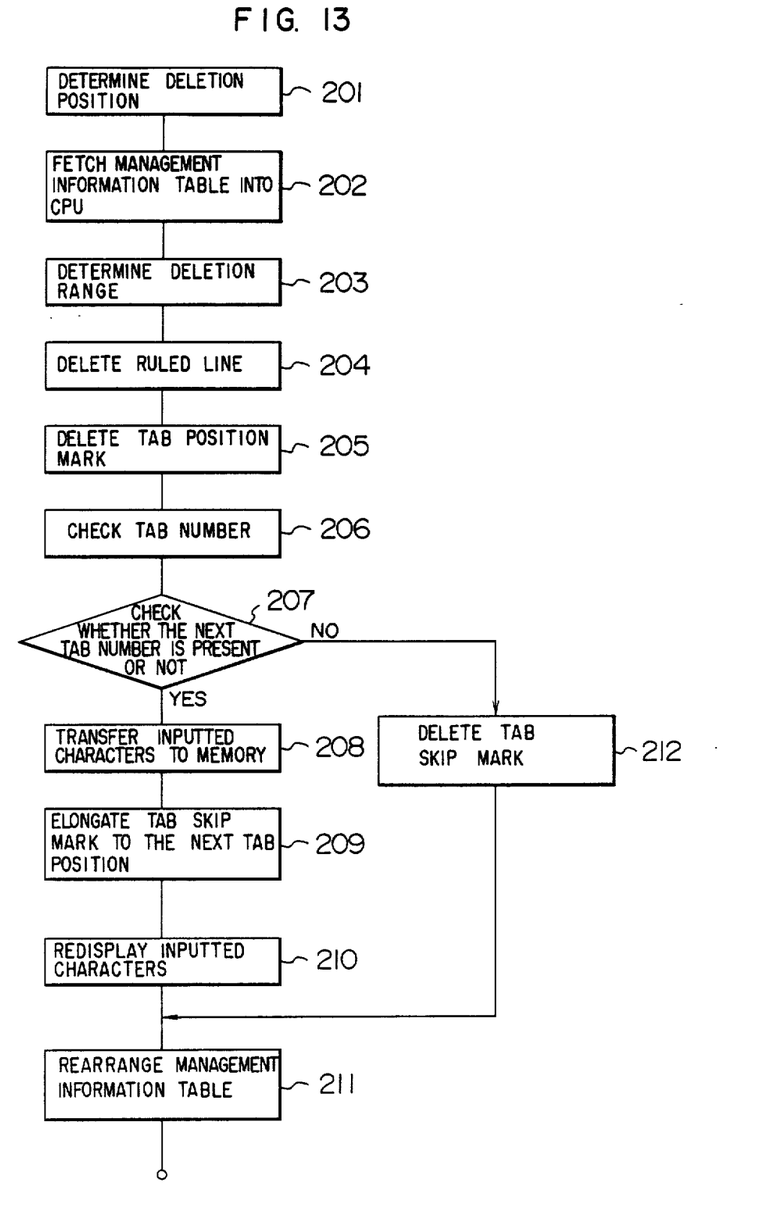
FIG. 13 is a flow chart for explaining a skipping-over operation of tab at a time a ruled line is deleted.

FIG. 13 is a flow chart showing tab skip processing which is carried out in deleting a vertical ruled line. Now, explanation will be made of the tab skip processing for the image of FIG. 11A and the management information table of FIG. 11B.

Referring to FIG. 13, a deletion position is determined from the column number of the position of the cursor (step 201). In step 202, management information on a vertical ruled line which is located at the deletion position, is fetched into the CPU 1. In step 203, a deletion range is determined from first specified position data 732 and second specified position data 734 which are contained in the management information as shown in FIG. 11B. Then, processing for deleting the ruled line 711b is carried out (step 204). In step 205, the tab position corresponding to the deleted, ruled line is detected from the management information, and processing for deleting the tab-position mark 712b from the column indicating region 702 is carried out.

Referring now to FIG. 11B, the number 735 of the deleted tab is detected from the management information (step 206). It is judged in step 207 whether a tab number following the tab number 735 is present or not. When the next tab number is present, a character string 736 which exists between the column indicated by the tab position mark 712b and the ruled line 711c, is temporarily stored in the work area (step 208), and the tab skip mark 723 is elongated to the ruled line 711c (step 209). Thereafter, the character string stored in the work area is displayed so as to start from the column indicated by the tab position mark 712c. When it is judged in step 207 that the next tab number is absent, the tab skip mark 723 is deleted.

When the above-mentioned processing is completed, information the deleted, ruled line and deleted tab is deleted from the management information table of FIG. 11B, and the contents of this table are rearranged. FIG. 12B shows a management information table which is obtained after the rearrangement has been made.

As has been explained in the foregoing, according to the present invention, a tab is automatically set or removed in accordance with the setting or deletion of a ruled line. Thus, in a case where character strings are arranged in each of regions bounded by ruled lines, no tabset operation is required, and hence a document can be prepared efficiently.

We claim:
1. A word processor comprising:
    input means having input keys for inputting input information, said input keys being used to input said input information, said information including characters, vertical ruled line data and processing commands;
    document editing means for editing a document based on said input information from said input means, said document editing means including automatic tabset means for detecting a desired tabset position based on row position information of said vertical ruled line data input by said input means and for automatically setting a tab based on said row position information of said vertical ruled lined data;
    display means for displaying various stages of an editing process being performed by said document editing means; and
    memory means for storing edited document data from said document editing means.

2. A word processor according to claim, wherein said document editing means further includes storage means for storing vertical ruled line data from said input means, and wherein said automatic tabset means includes column determining means for determining a column number of a position where a tab is to be set, from a column number of the position of vertical ruled line data stored in said storage means, and display control means for displaying a tab position mark in a column on said display means which is indicated by said column number determined by said column determining means.

3. A word processor according to claim 2, wherein a column number following said column number of the position of said vertical ruled line data indicates a column number of a position where a tab is to be set.

4. A word processor according to claim 2, wherein said document editing means includes ruled-line deleting means for deleting vertical ruled line data stored in said storage means, and wherein said automatic tabset means includes automatic tab removal means for automatically removing a tab which corresponds to deleted vertical ruled line data.

* * * * *